United States Patent [19]
Petri

[11] Patent Number: 5,967,923
[45] Date of Patent: Oct. 19, 1999

[54] TENSIONER FOR BELTS AND CHAINS

[75] Inventor: Werner Petri, Erlangen, Germany

[73] Assignee: INA Walzlager Schaeffler KG, Germany

[21] Appl. No.: 08/801,900

[22] Filed: Feb. 14, 1997

[30] Foreign Application Priority Data

Mar. 11, 1996 [DE] Germany .............................. 196 09 420

[51] Int. Cl.⁶ ...................................................... F16H 7/12
[52] U.S. Cl. .......................... 474/138; 474/101; 474/117; 474/135; 474/136
[58] Field of Search .................................... 474/138, 101, 474/110, 117, 135, 136

[56] References Cited

U.S. PATENT DOCUMENTS

| | | | |
|---|---|---|---|
| 4,300,890 | 11/1981 | Hallmann et al. | 474/138 X |
| 4,976,660 | 12/1990 | Breindl . | |
| 5,482,262 | 1/1996 | Hayakawa et al. | 474/138 X |
| 5,658,212 | 8/1997 | Meurer et al. | 474/110 |
| 5,713,809 | 2/1998 | Yamamoto et al. | 474/138 X |

FOREIGN PATENT DOCUMENTS

| | | |
|---|---|---|
| 0289814 | 6/1990 | European Pat. Off. . |
| 4039816 | 4/1992 | Germany . |
| 9508244 | 10/1995 | Germany . |

*Primary Examiner*—Donald P. Walsh
*Assistant Examiner*—Emmanuel M. Marcelo
*Attorney, Agent, or Firm*—Bierman, Muserlian and Lucas

[57] ABSTRACT

A tensioner for belts and chains having a housing (1) in which a cylinder (3) containing a slidably guided piston (4) is arranged which piston (4) is supported radially by a guide bush (5), one end of a compression spring (13) engaging the piston (4), while the other end thereof engaging a cylinder base (6) of the cylinder (3), which cylinder base (6) is axially supported on a housing bottom (9) by a self-adjusting bearing (10) whereby, to improve the correction of alignment errors between the cylinder (3) and the piston (4), a plurality of peripherally adjacent raised portions (10) made of a ductile material are arranged between the housing bottom (9) and the cylinder base (6) and are plastically deformable under loading by the spring-loaded cylinder base (6).

8 Claims, 2 Drawing Sheets

TENSIONER FOR BELTS AND CHAINS

FIELD OF THE INVENTION

The invention concerns a tensioner for traction means, particularly belts and chains, comprising a housing on which a hydraulically damped piston which is slidably guided in a cylinder is radially supported by a guide bush, the traction means being tensioned by a compression spring whose one end engages the piston and whose other end engages a cylinder base of the cylinder, which cylinder base is supported on a housing bottom by a self-adjusting bearing

BACKGROUND OF THE INVENTION

A tensioner of the pre-cited type is known, for example, from DE-C 40 39 816, wherein the self-adjusting bearing is constituted by a sliding bearing with the cylinder base having a spherical convex sliding surface and the housing bottom having a spherical concave sliding surface. To prevent undesired relative tilting between the piston rod and the cylinder or the guide bush, this float mounting arrangement permits adjusting movements of the cylinder base relative to the housing. This assures an alignment between the guide bush and the piston and between the cylinder and the piston. A drawback of such a float mounting is that a sliding movement between the cooperating spherical sliding surfaces can only take place when their static friction has been overcome. However, when compression springs with high compression pressures are used, it is possible that the balancing movements in the float mounting do not take place because the existing static friction is not overcome. A further drawback resides in the fact that mating convex and concave sliding surfaces involve complicated manufacturing steps and high costs.

OBJECTS OF THE INVENTION

It is an object of the invention to improve a tensioner of the generic type whereby an automatic compensation of alignment errors between sliding parts is assured, even when compression springs with high compression pressures are used.

This and other objects and advantages of the invention will become obvious from the detailed description.

SUMMARY OF THE INVENTION

The tensioner of the invention for traction means comprises a housing (1) on which a hydraulically damped piston (4) which is slidably guided in a cylinder (3) is radially supported by a guide bush (5), the traction means being tensioned by a compression spring (13) whose one end engages the piston (4) and whose other end engages a cylinder base (6) of the cylinder (3), which cylinder base (6) is supported on a housing bottom (9) by a self-adjusting bearing (10), is characterized in that a plurality of peripherally adjacent raised portions (10) made of a ductile material are provided between the housing bottom (9) and the cylinder base (6), and said raised portions (10) are plastically deformable under loading by the spring-loaded cylinder base (6).

The invention achieves the above object by the fact that a plurality of peripherally adjacent raised portions made of a ductile material are provided between the housing bottom and the cylinder base, and these raised portions are plastically deformable under loading by the spring-loaded cylinder base. The piston is guided with very slight clearance in the cylinder. If the piston is likewise guided with very slight clearance in the guide sleeve, the cylinder base is at first not adequately supported on the raised portions when the guide sleeve is not in its optimum position. This can mean for instance, that the cylinder base bears only against one of the raised portions while being spaced from the other peripherally adjacent raised portions. Due to the axial compressive force of the compression spring, the raised portion against which the cylinder base bears is plastically deformed, and the distance between the cylinder base and the other raised portions is reduced until, finally, the cylinder base is adequately supported on a sufficient number of raised portions. When this position of the cylinder is reached, alignment errors between the slidable parts are largely eliminated. A radial displacement of the cylinder base in excess of a permissible radial play can be effectively prevented by supporting the cylinder base in radial direction by a radial support The raised portions are preferably made integrally on the housing which is made of an aluminum alloy while the cylinder base is made of steel. An appropriate shape of the raised portions can be obtained, for example, by the use of strips whose long ends facing the cylinder base comprise two intersecting surfaces which form a contact edge for the cylinder base. If the aluminum housing is made by die casting, the raised portions can easily be made with the same tools without appreciable additional work. An appropriate orientation of the contact edges is obtained by arranging them so that their imaginary extensions intersect at the cylinder axis.

Due to the small surface of contact with the cylinder base, the surface pressure under the spring load is very high in the region of the contact edges. When the surface pressure surpasses the yield point of the ductile material, the contact edges are plastically deformed and pressed flat. It goes without saying that the raised portions of the invention can also be constituted, for example, by wedges. The configuration of the raised portions is not limited to any particular shape, the only requirement being that a plastic deformation of the raised portions occurs under the spring load.

In the prior art tensioner, the cylinder base, the cylinder and the piston delimit a pressure chamber, and the cylinder base comprises a non-return valve opening towards the pressure chamber. The cylinder base is made in a single piece with the cylinder so that, depending on the manufacturing procedure, intensive forming or machining work is required. To simplify manufacturing, it is proposed that the cylinder base comprise a reception bore for the cylinder, and the cylinder bear closely against the wall of the reception bore. In this case, the cylinder can be made of common commercial tube material and only the cylinder base has to be machined, if necessary.

In such tensioners, the non-return valve opens upon a displacement of the piston in a direction of enlarging the pressure chamber. The suctioned hydraulic oil flows between the cylinder base and the housing bottom, and the raised portions made of ductile material keep the housing bottom and the cylinder base spaced from one another, thus defining oil channels. Besides lodging the piston and the cylinder, the housing also serves as a reservoir for the hydraulic oil. To assure that the hydraulic oil can flow freely to the housing bottom and the non-return valve, it is proposed that the radial support be constituted by a plurality of circumferentially spaced radial projections on the housing. This means that openings are formed between adjacent projections and allow the hydraulic oil to flow freely to the housing bottom.

In the prior art tensioner, a spring retainer arranged on the piston is fixed by a corrugated ring in the relaxing direction of the spring and the corrugated ring engages into a circumferential groove made on the pistons It is proposed that this circumferential groove which tapers in a radially inward direction be defined by at least one bevel and one a cylindrical base surface of the piston in Applicant's construction. As viewed from the free end of the piston, this bevel is preferably arranged behind the cylindrical base surface for the following reasons: During mounting of the sealing ring on the piston, the sealing ring at first passes the cylindrical base surface. Due to the presence of the bevel, the sealing lip of the sealing ring is moved along the bevel, once again onto the outer diameter of the piston without encountering any sharp edge. With conventional-type grooves for corrugated rings, the danger of the sealing lip of the sealing ring being damaged is considerable and the circumferential groove provided by the invention eliminates any such danger.

BRIEF DESCRIPTION OF THE DRAWINGS

The drawings show an embodiment of the invention which is represented in four figures.

DETAILED DESCRIPTION OF THE DRAWINGS

Figure 1:
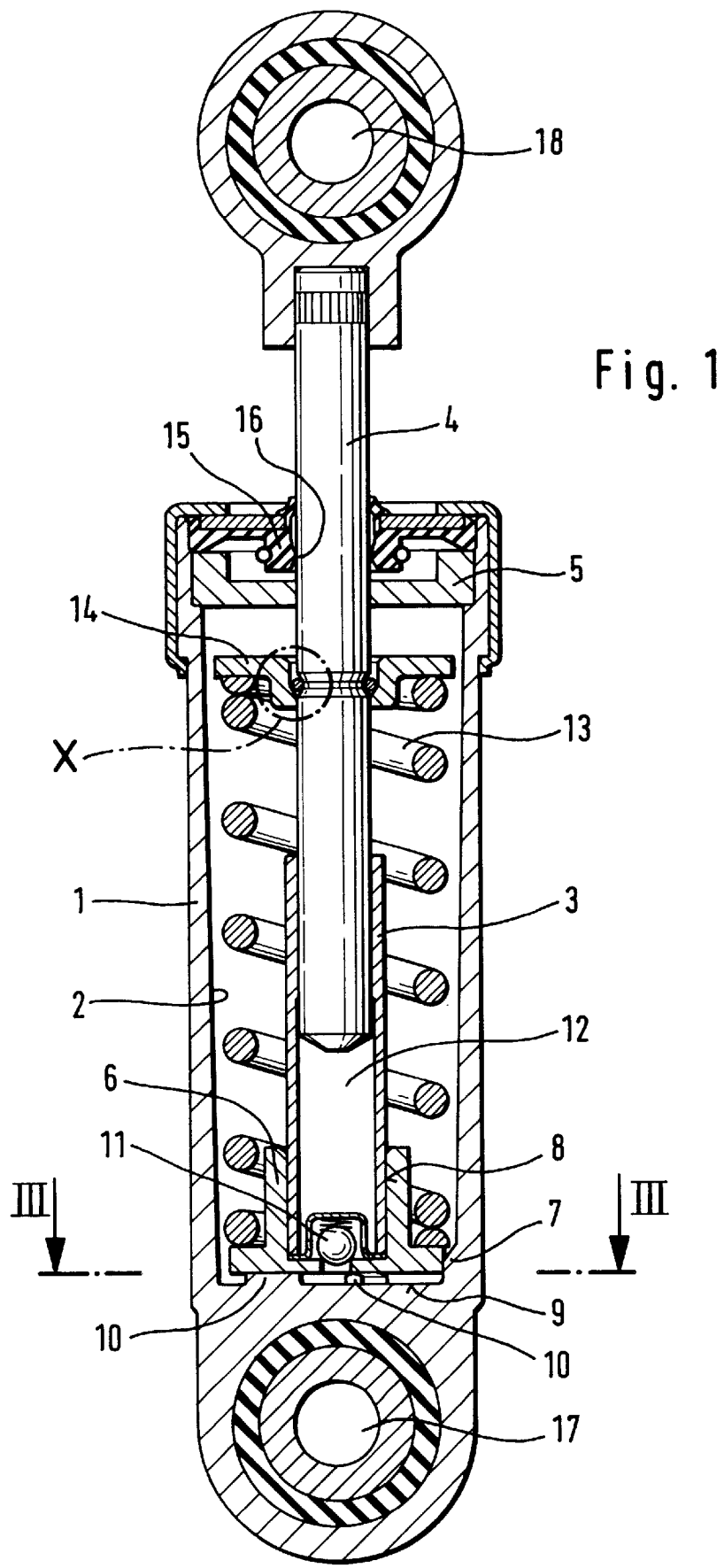
FIG. 1 is a longitudinal cross-section through a tensioner of the invention.

The tensioner represented in FIG. 1 comprises a housing 1 in whose cylindrical bore 2 a cylinder 3 containing a slidable piston 4 arranged. The piston 4 is radially supported by a guide bush 5 which is fixed on the housing 1. A cylinder base 6 of the cylinder 3 is radially supported on radial projections 7 of the housing 1 and the cylinder base 6 comprises a bore 8 against whose wall the cylinder 3 bears closely. A plurality of raised portions 10 made integrally on the housing 1 are arranged in spaced relationship along the periphery of the housing bottom 9. The housing 1, and more particularly, the raised portions 10 are made of a ductile material, for example an aluminum alloy. A non-return valve 11 arranged in the cylinder base 6 opens towards a pressure chamber 12 defined by the cylinder base 6, the cylinder 3 and the piston 4. A coiled compression spring 13 arranged in the bore 2 is supported at one end on the cylinder base 6 and at the other end on a spring retainer 14 which is axially supported on the piston 4. A sealing ring 15 provided for sealing the open housing 1 comprises a sealing lip 16 which bears against the piston 4. The housing 1 and the piston 4 each comprise a connecting eye 17, 18 for fixing the tensioner on a stationary machine element, not shown, and for fixing a tensioning means, not shown, which loads a traction means, also not shown.

Figure 2:
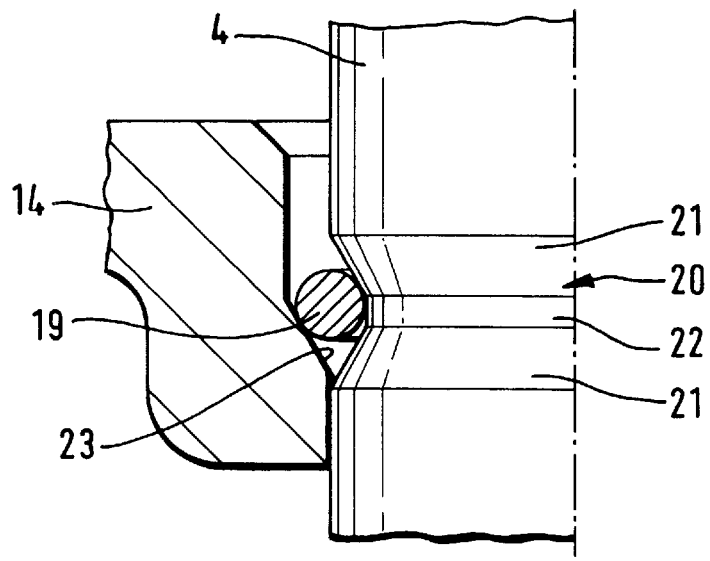
FIG. 2 is an enlarged representation of a corrugated ring snapped into a circumferential groove.

The detail X can better be seen in the enlarged representation of FIG. 2. A corrugated ring 19 is arranged in a circumferential groove 20 of the piston 4 and the circumferential groove 20 is defined by two axially adjacent bevels 21 and a cylindrical base surface 22 intermediate thereof. The corrugated ring 19 bears against the upper bevel 21 and against a conical surface 23 of the spring retainer 14, which results in a positive locking between the spring retainer 14 and the piston 4 in the loading direction of the coiled compression spring 13.

Figure 3:
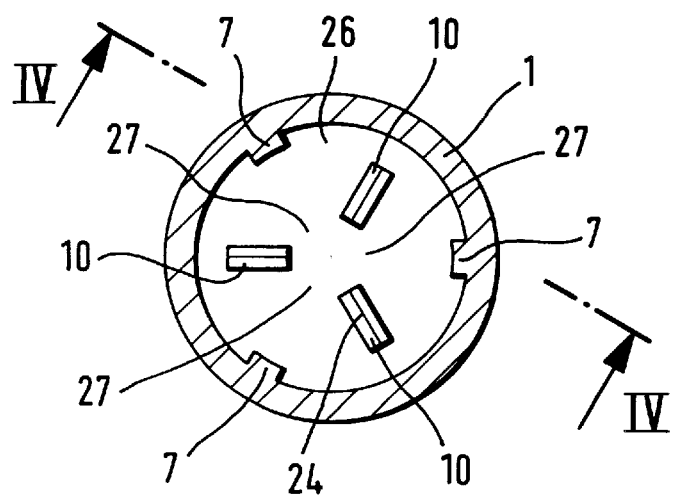
FIG. 3 is a cross-sectional view of the tensioner of FIG. 1 along line III—III of FIG. 1
Figure 4:
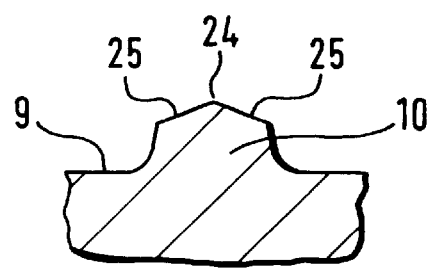
FIG. 4 is a sectional view along line IV—IV of one of the raised portions represented in FIG. 3.

The aforesaid raised portions 10 and radial projections 7 can better be seen in FIGS. 3 and 4. The raised portions 10 are formed by strips whose long ends facing the cylinder base 6 comprise two intersecting surfaces 25 which form a contact edge 24 for contact with the cylinder base 6. The imaginary extensions of the contact edges 24 intersect in the cylinder axis. FIG. 3 further clearly shows the radial projections 7 on which the cylinder base, not shown here, is radially supported. Segment-shaped openings 26 are formed between the cylinder base 6 and the housing 1 through which openings 26, hydraulic oil collected in the bore 2 of the housing 1 can flow to the housing bottom 9. Oil channels 27 are formed between the flat end surface of the cylinder base 6 and the housing bottom 9 due to the fact that the cylinder base 6 is kept spaced from the housing bottom 9 by the raised portions 10 This assures that oil can be suctioned at all times into the pressure chamber 12 without any problem through the non-return valve 11.

Under certain circumstances, it is possible that the guide bush 5 of the piston 4 is not adequately fixed on the housing 1 so that the cylinder 3 or the cylinder base 6 is tilted relative to the housing bottom 9. In such a case, the cylinder base 6 bears at first, for example, only against one of the raised portions 10. Due to the fact that the raised portions 10 are made of a ductile material and taper to an end, the surface pressure between the cylinder base 6 and the raised portion 10 under the full load of the spring finally becomes so great that the yield point of the ductile material is surpassed This leads to a plastic deformation of the raised portion 10 causing the contact edge 24 to be flattened so that the cylinder base 6 successively approaches the other raised portions 10 to finally bear against these as well, if necessary, with further plastic deformation When no further plastic deformation takes place, the cylinder base 6 is firmly seated on the housing bottom 9, it being possible that all raised portions 10 have undergone a plastic deformation when this stage is reached. Due to the fact that after completion of the plastic deformation, the cylinder base 6 is firmly seated on the housing bottom 9, no tilting moment caused by the compressive force of the coiled compression spring 13 can be transmitted through the cylinder 3 to the piston 4.

When pushed onto the piston 4, the sealing ring 15 passes the circumferential groove 20. Since the circumferential groove comprises bevels 21, i.e. it is free from sharp edges, the sealing lip 16 of the sealing ring 15 is not damaged. If it is usual to disassemble the tensioner, for example in case of repair, and to replace the sealing ring 15 by a new one prior to re-assembly, the bevel 21 nearer the free end of the piston 4 may be omitted because, in this case, it is of no consequence if the sealing ring 15 is damaged during removal from the piston 4.

Various modifications of the tensioner of the invention may be made without departing from the spirit or scope thereof. It is to be understood that the invention is intended to be limited only as defined in the appended claims.

What I claim is:

1. A tensioner for traction means comprising a housing (1) on which a hydraulically damped piston (4) which is slidably guided in a cylinder (3) is radially supported by a guide bush (5), the traction means being tensioned by a compression spring (13) whose one end engages the piston (4) and whose other end engages a cylinder base (6) of the cylinder (3), which cylinder base (6) is supported on a housing bottom (9) by a self-adjusting bearing (10) characterized in that a plurality of peripherally adjacent raised portions (10) made of a ductile material are, provided between the housing bottom (9) and the cylinder base (6), and said raised portions (10) are plastically deformable under loading by the spring-loaded cylinder base (6).

2. A tensioner of claim 1 wherein the cylinder base (6) is supported radially in the housing (1) by a radial support (7).

3. A tensioner of claim 2 wherein the radial support is formed by a plurality of circumferentially spaced radial projections (7) on the housing (1).

4. A tensioner of claim 1 wherein the housing (1) and the raised portions (10) formed integrally thereon are made of an aluminum alloy, and the cylinder base (6) is made of steel.

5. A tensioner of claim 1 wherein the raised portions (10) are formed out of strips whose long ends facing the cylinder base (6) comprise two intersecting surfaces (25) which form a contact edge (24) for the cylinder base (6).

6. A tensioner of claim 5 wherein imaginary extensions of the contact edges (24) intersect at an axis of the cylinder (3).

7. A tensioner of claim 1 wherein the cylinder base (6), the cylinder (3) and the piston (4) define a pressure chamber (12), the cylinder base (6) comprises a non-return valve (11) opening towards the pressure chamber (12), and the cylinder base (6) further comprises a reception bore (8) for the cylinder (3) which bears closely against a wall of the reception bore (8).

8. A tensioner of claim 1 wherein a spring retainer (14) arranged on the piston (4) is fixed in an axial direction by a corrugated ring (19) which engages into a circumferential groove (20) made on the piston (4), the circumferential groove (20) tapers in radially inward direction while being defined by at least one bevel (21) and a cylindrical base surface (22) of the piston (4).

* * * * *